US008782101B1

(12) United States Patent
Moore

(10) Patent No.: US 8,782,101 B1
(45) Date of Patent: Jul. 15, 2014

(54) TRANSFERRING DATA ACROSS DIFFERENT DATABASE PLATFORMS

(75) Inventor: Matthew Aaron Moore, San Francisco, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/354,728

(22) Filed: Jan. 20, 2012

(51) Int. Cl.
*G06F 7/00* (2006.01)

(52) U.S. Cl.
USPC .......................................... 707/811; 707/602

(58) Field of Classification Search
CPC ............ G06F 17/303; G06F 17/30569; G06F 17/30563
USPC ................................................. 707/811, 602
See application file for complete search history.

(56) References Cited

U.S. PATENT DOCUMENTS

| | | | |
|---|---|---|---|
| 5,201,046 A * | 4/1993 | Goldberg et al. ..................... 1/1 |
| 5,708,828 A * | 1/1998 | Coleman ....................... 715/205 |
| 5,832,481 A * | 11/1998 | Sheffield ............................... 1/1 |
| 6,154,748 A * | 11/2000 | Gupta et al. .......................... 1/1 |
| 6,247,018 B1 * | 6/2001 | Rheaume ............................. 1/1 |
| 6,643,633 B2 * | 11/2003 | Chau et al. ........................... 1/1 |
| 6,704,747 B1 * | 3/2004 | Fong .................................... 1/1 |
| 6,789,163 B2 * | 9/2004 | Fox et al. ....................... 711/112 |
| 7,031,987 B2 * | 4/2006 | Mukkamalla et al. ................ 1/1 |
| 7,174,327 B2 * | 2/2007 | Chau et al. ........................... 1/1 |
| 7,272,600 B1 * | 9/2007 | Singh ................................... 1/1 |
| 7,293,040 B2 * | 11/2007 | Terada .................................. 1/1 |
| 7,343,364 B2 * | 3/2008 | Bram et al. ..................... 706/47 |
| 7,421,440 B2 * | 9/2008 | Pereira ................................. 1/1 |
| 7,437,347 B1 * | 10/2008 | Chapman ............................. 1/1 |
| 7,571,173 B2 * | 8/2009 | Yang et al. ........................... 1/1 |
| 7,664,795 B2 * | 2/2010 | Balin et al. .................... 707/661 |
| 7,707,177 B2 * | 4/2010 | Bank et al. .................... 707/617 |
| 7,761,406 B2 * | 7/2010 | Harken ......................... 707/602 |
| 8,219,518 B2 * | 7/2012 | Jin et al. ........................ 707/602 |
| 8,275,742 B2 * | 9/2012 | Bhatt et al. ................... 707/610 |
| 8,341,120 B2 * | 12/2012 | Barton et al. ................. 707/640 |
| 8,402,001 B1 * | 3/2013 | Tovo ............................ 707/682 |
| 8,433,664 B2 * | 4/2013 | Ziegler et al. .................. 706/15 |
| 2002/0143733 A1 * | 10/2002 | Mukkamalla et al. ............ 707/1 |

(Continued)

OTHER PUBLICATIONS

Tushar, "Oracle Data Export and Import Utility", ORA Training blog, posted on Jun. 23, 2009, 10 pages, accessed online at <http://www.oratraining.com/blog/2009/06/oracle-export-import-utility-exp-imp-tutorial/> on Jul. 15, 2013.*

(Continued)

*Primary Examiner* — Phuong Thao Cao
(74) *Attorney, Agent, or Firm* — Foley & Lardner LLP; Edward A. Gordon

(57) ABSTRACT

Methods and systems for transferring data across incompatible database platforms are provided. A method may include reading data from a database export file containing a representation of objects and data from a source database of a first database platform, where the file was generated by an export utility of the first database platform, has a format specific to the first database platform, and is stored outside of the source database. The data read from the file is parsed based on the format. At least one database table represented in the file is identified based on the parsing. Row-level data associated with the at least one database table is also identified based on the parsing. The row-level data is collected in a buffer and is then inserted into a destination database of a second database platform using at least one dedicated data insertion thread.

33 Claims, 4 Drawing Sheets

(56) References Cited

U.S. PATENT DOCUMENTS

| | | | |
|---|---|---|---|
| 2002/0174098 A1* | 11/2002 | Wu et al. .......................... 707/1 |
| 2002/0198897 A1* | 12/2002 | Geuss et al. ................. 707/200 |
| 2004/0236796 A1* | 11/2004 | Bhatt et al. ................... 707/200 |
| 2005/0055351 A1* | 3/2005 | Barton et al. .................. 707/10 |
| 2005/0060324 A1* | 3/2005 | Johnson et al. ............... 707/100 |
| 2005/0149537 A1* | 7/2005 | Balin et al. ................... 707/100 |
| 2005/0253739 A1* | 11/2005 | Hu et al. .......................... 341/1 |
| 2005/0256892 A1* | 11/2005 | Harken ......................... 707/101 |
| 2005/0256908 A1* | 11/2005 | Yang et al. ................... 707/200 |
| 2006/0047717 A1* | 3/2006 | Pereira ......................... 707/204 |
| 2006/0059140 A1* | 3/2006 | Noe et al. .......................... 707/4 |
| 2006/0136483 A1* | 6/2006 | Nguyen et al. ............... 707/102 |
| 2006/0143187 A1* | 6/2006 | Mukkamalla et al. ......... 707/10 |
| 2006/0184561 A1* | 8/2006 | Terada .......................... 707/102 |
| 2006/0222163 A1* | 10/2006 | Bank et al. .............. 379/221.08 |
| 2007/0050420 A1 | 3/2007 | Sankruthi |
| 2008/0120351 A1* | 5/2008 | Khaladkar et al. ............ 707/204 |
| 2008/0168082 A1* | 7/2008 | Jin et al. ........................ 707/102 |
| 2009/0055429 A1* | 2/2009 | Notarnicola et al. ......... 707/102 |
| 2009/0106278 A1* | 4/2009 | Ramacher et al. ........... 707/100 |
| 2009/0282036 A1* | 11/2009 | Fedtke .............................. 707/6 |
| 2010/0057666 A1* | 3/2010 | Ziegler et al. ................... 706/59 |
| 2010/0318556 A1* | 12/2010 | Mckay et al. ................. 707/769 |
| 2011/0078340 A1* | 3/2011 | Kim et al. ........................ 710/18 |
| 2011/0082882 A1* | 4/2011 | Denison et al. ............... 707/770 |
| 2011/0099155 A1 | 4/2011 | Shau et al. |
| 2011/0107327 A1* | 5/2011 | Barkie et al. .................. 717/176 |
| 2011/0246534 A1* | 10/2011 | Simon ........................... 707/802 |
| 2012/0029930 A1* | 2/2012 | Calle et al. ......................... 705/2 |
| 2012/0124550 A1* | 5/2012 | Nocera et al. ................. 717/104 |
| 2012/0221536 A1* | 8/2012 | Chen et al. .................... 707/702 |
| 2013/0021156 A1* | 1/2013 | Roatis et al. .................. 340/541 |
| 2013/0173547 A1* | 7/2013 | Cline et al. .................... 707/638 |
| 2013/0185251 A1* | 7/2013 | Garg ............................. 707/602 |

OTHER PUBLICATIONS

ViSolve Migration Team, "A Complete Cross Platform Database Migration Guide Using Import and Export Utility", Nov. 15, 2011, 14 pages, accessed online at <http://www.visolve.com/uploads/resources/A%20Complete%20Cross%20Platform%20Database%20Migration%20Guide%20Using%20Import%20and%20Export%20Utility.pdf> on Jul. 15, 2013.*

Rich, Kathy, "Data Pump Import," Oracle Database Utilities, 10g Release 1 (10.1), http://docs.oracle.com/cd/B12037_01/server.101/b10825.pdf, Dec. 2003, pp. 3-1 to 3-56.

Rich, Kathy, "Data Pump Performance," Oracle Database Utilities, 10g Release 1 (10.1), http://docs.oracle.com/cd/B12037_01/server.101/b10825.pdf, Dec. 2003, pp. 4-1 to 4-3.

"Converting a postgres database to mysql," webERP: HowToConvert, http://www.weberp.org/HowToConvert, last revised on Feb. 22, 2008, accessed on Mar. 15, 2012, 2 pages.

"DBConvert for MySQL & PostgreSQL," http://dbconvert.com/convert-mysql-to-postgresql-pro.php, release date Oct. 27, 2011, accessed Mar. 6, 2012, 2 pages.

"4.5.5. mysqlimport—A Data Import Program," MySQL 5.1 Reference Manual, http://dev.mysql.com/doc/refman/5.1/en/mysqlimport.html, Oracle Corporation and/or its affiliates, last accessed Mar. 15, 2012, 10 pages.

"pg2mysql converter (PostgreSQL to MySQL Converter)," Lightbox Technologies Inc., latest version Jul. 20, 2011, accessed Mar. 6, 2012, http://www.lightbox.ca/pg2mysql.php, 1 page.

"pg-dump," PostgreSQL 8.1.23 Documentation, PostgreSQL, http://www.postgresql.org/docs/8.1/static/app-pgdump.html, PostgreSQL Global Development Group, last accessed Mar. 15, 2012, 7 pages.

* cited by examiner

US 8,782,101 B1

TRANSFERRING DATA ACROSS DIFFERENT DATABASE PLATFORMS

TECHNICAL FIELD

The field relates to database systems.

BACKGROUND

Databases are used to organize, search, secure, and store data. A database management system is software that provides functionality to create, operate, manage, and utilize databases. A specific database management system product may be referred to as a database platform.

One or more databases may be used to support a software application or business function. Additional databases may be required to share, aggregate, transform, analyze, and archive data. In many cases, large amounts of data must be transferred across database systems operating on different platforms.

Database platforms provide utilities to transfer data between databases on the same platform. However, traditional import and export utilities typically are not compatible with other platforms. This increases the level of complexity and effort required to transfer data across database platforms and typically results in custom workarounds.

BRIEF SUMMARY

Embodiments relate to transferring data across different database platforms. In one embodiment, a method includes reading data from a file generated by an export utility of a first database platform, containing a representation of objects and data from a source database of the first database platform, where the file has a format specific to the first database platform, and the file is stored outside of the source database. Data read from the file is parsed based on the format. At least one database table represented in the file is identified based on the parsing. Row-level data associated with at least one database table is also identified based on the parsing. The identified row-level data is collected in a buffer, which is then inserted into a destination database of a second database platform using at least one dedicated data insertion thread.

In another embodiment, a system for transferring data across different database platforms includes a data reader, a data processor, and a data loader. The data reader is configured to read data from a file generated by an export utility of a first database platform, stored outside of a source database of the first database platform, where the file contains at least a representation of objects and data from the source database, and the file has a format specific to the first database platform. The data processor is configured to parse the data read from the file based on the format, identify at least one database table represented in the file based on the parsing, identify row-level data associated with at least one database table based on the parsing, and collect the row-level data in a buffer. The data loader is configured to insert the collected row-level data into a destination database of a second database platform using at least one dedicated data insertion thread.

In an additional embodiment, a computer-readable storage device has control logic recorded thereon that when executed by a processor, causes the processor to transfer data across different database platforms. The control logic includes computer-readable program code to cause the processor to read data from a file generated by an export utility of a first database platform, stored outside of a source database of the first database platform, where the file contains at least a representation of objects and data from the source database, and the file has a format specific to the first database platform. The control logic also includes computer-readable program code to parse the data read from the file, identify at least one database table represented in the file, identify row-level data associated with identified database tables, collect the row-level data in a buffer, and insert the collected row-level data into a destination database of a second database platform using at least one dedicated data insertion thread.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form part of the specification, illustrate embodiments of the present invention and, together with the description, further serve to explain the principles of the embodiments and to enable a person skilled in the relevant art(s) to make and use the embodiments.

Figure 1:
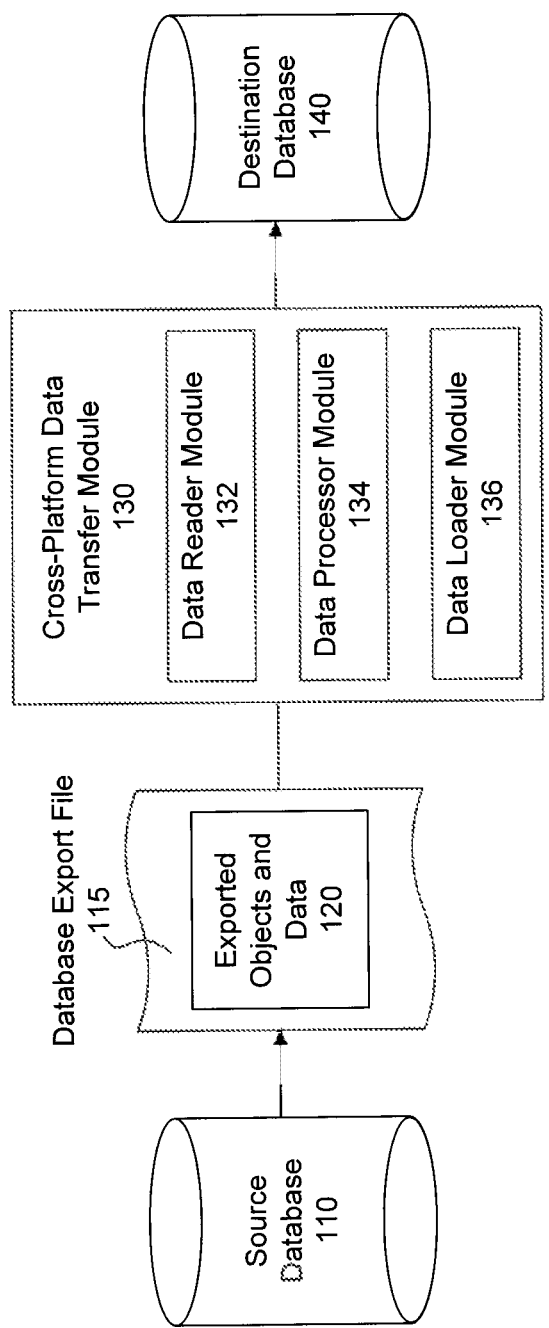
FIG. 1 is a diagram illustrating a system for transferring data across different database platforms according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic with other embodiments whether or not explicitly described.

Example of Transferring Data Across Different Database Platforms

Various embodiments include methods and systems for rapidly transferring data across different database platforms.

Any organization, such as a business, government agency, or educational institution may use a variety of different private, commercial, and open source database platforms to store and manage data. Such organizations may wish to transfer large amounts of data across database systems running on different platforms within their own enterprise. These organizations also may wish to share data externally with third parties that may not use the same database platforms.

In one example, a need exists to transfer a large amount of data from a source database system to a destination database system running on a different platform. Database objects and data may be extracted from the source database system to a database export file residing on a local or remote storage device. The specific formatting and organization of the database export file may be based on export utility functionality of the database platform on which the source database system operates. The particular database objects and data exported from the source database may be based on database export utility parameters provided by a user. The database export file, which is stored outside of the source database, may be transferred or copied to one or more locations for uses such as storage, backup, or data transfer.

Next, a data transfer program designed to transfer data across different database platforms may detect the presence of a database export file in a specific location on a file system. In other embodiments, the data transfer program may be initiated by a user or scheduled process. The data transfer program may determine the format of the database export file based on at least one file property, the structure of data contained within the database export file, or one or more configuration parameters.

The data transfer program reads the database export file based on a format associated with a determined source database platform. The data transfer program then parses the contents of the database export file, which may be represented in a textual or binary format.

The data transfer program identifies one or more database objects represented within the database export file to be transferred to the destination database. Database objects may include structures capable of holding data, such as tables and materialized views.

The data transfer program then identifies row-level or object-level data associated with the database objects and collects the data in a buffer. The size of the buffer may be fixed or variable and may be determined based on a configurable parameter. Once a buffer becomes full, the data transfer program locates and uses an available dedicated data insertion thread to insert the collected data into identical database objects existing within a destination database.

The data transfer program continues reading, parsing, identifying and collecting data in one or more additional buffers while the dedicated data insertion thread inserts data into the destination database. The overall number of dedicated data insertion threads may vary depending on available computer system resources and also may be based on one or more configuration parameters.

While the data insertion continues, a second buffer becomes full. The data transfer program may then use a second available dedicated data insertion thread to begin inserting data from the most recently filled buffer. Dedicated data insertion threads may operate in parallel with each other and also allow for continued reading and processing of a database export file. Data becomes available for use within the destination database system once committed by a data insertion thread.

Embodiments may be used to process a database export file generated by an export utility of a source database platform. This may be performed using less-powerful and non-distributed computer systems. For example, embodiments may be implemented using a single computer system that has access to a database export file generated by an export utility of a source database platform.

Embodiments also may be used when source and target systems do not have access to the same software or platforms. In addition, embodiments may be used to identify and extract source data from a database export file generated by an export utility of a source database platform, convert the source data to a destination database format, and rapidly load the data into a destination database of a different database platform.

Illustrated System for Transferring Data Across Different Database Platforms

FIG. 1 is a block diagram illustrating a system 100 for transferring data across different database platforms according to an embodiment. System 100 includes source database 110, database export file 115, exported objects and data 120, cross-platform data transfer module 130, and destination database 140. In an embodiment, cross-platform data transfer module 130 includes data reader module 132, data processor module 134, and data loader module 136.

Source database 110 and destination database 140 may be active database instances. Each may operate on a computer system, and each may be connected to a network via a network interface. Source database 110 and destination database 140 each operate on different database platforms, meaning different database management software available from an organization such as a commercial vendor or open source community. Various database platforms may include, but are not limited to, Oracle, Sybase, Microsoft SQL Server, MySQL, PostgreSQL, IBM DB2, Informix, and SQLite.

Source database 110 and destination database 140 each individually may represent a single database instance or multiple, clustered, or federated database instances. Further, source database 110 and destination database 140 may be any type of database, such as a relational, object, object-relational, XML, in-memory, embedded, cloud, distributed, mobile, document management, spatial, or unstructured database.

A database platform may have one or more export utilities designed to extract or copy database objects and data from a source database 110, to an external database export file. A database export file containing exported objects and data 120 can then be copied and transferred like any other file. In addition, exported objects and data 120 may be imported into another database of the same platform as source database 110 regardless of hardware implementation, operating system, and platform versioning.

Database export utilities accept various parameters to define the scope of objects and data to be exported from a database. Such utilities may be used to export an entire database or a subset of objects and data. Subsets of objects and data may be exported in a variety of ways, including by object name, by database user, and by logical groupings.

The output of a database export utility is database export file 115, which may contain exported objects and data 120 from source database 110 in a text or binary format. Database export file 115 may be located on a computer readable medium and may be transferred either physically or via a network interface.

Cross-platform data transfer module 130 may be configured to read and process database export files from one or more source database platforms. In addition, cross-platform data transfer module 130 may be configured to import exported objects and data 120 into one or more different destination platforms.

Cross-platform data transfer module 130 includes data reader module 132, data processor module 134, and data loader module 136. Cross-platform data transfer module 130 may operate on a computer system and may be connected to a network via a network interface. Cross-platform data transfer module 130 may reside on its own computer system or on the same computer system as either source database 110 or destination database 140.

Data reader module 132 may be configured to read information contained within a database export file 115 based on a database export file format associated with the platform of source database 110. Additionally, data reader module 132 also may be configured to read database export files of one or more different database platforms. Data reader module 132 may read database export files residing on the same computer system as cross-platform data transfer module 130 and also may access database export files located on a remote computer system or device. In addition, data reader module 132 may read text or binary database export files and may convert at least some portion of a binary file to text for processing.

Data processor module 134 is responsible for identifying database objects and data within database export file 115, which data loader module 136 will insert into destination database 140. Data processor module 134 parses the data read by data reader module 132 according to a database export file format associated with a source database platform. Data processor module 134 may parse database export file 115 based on, for example and without limitation, an occurrence of a keyword or special character, organization of data, positioning of data, or relationships between data. Parsing is used to identify representations of objects, metadata, and data within database export file 115, based on an export file format associated with the platform of source database 110.

Data processor module 134 then identifies exported objects and data 120 in database export file 115 based on the performed parsing. Data processor module 134 may identify an indication of a database object, such as a database table or materialized view. Data processor module 134 may then identify metadata associated with the database object, such as a table definition. Data processor module 134 may then identify row-level data associated with the database object. Once the row-level data is identified, it may be extracted from database export file 115, converted to another format, and loaded into destination database 140.

Data processor module 134 may determine whether the identified row-level data is represented in a format that is compatible with destination database 140. In addition, data processor module 134 may convert identified data to a format that is compatible with destination database 140, when it determines that the format of the identified source data is not in a format that is compatible with destination database 140.

Data processor module 134 may store identified data associated with a database object in a buffer, which may be an array, list, table, or any other similar structure or object that can hold data. A buffer may be configured based on a specific metadata definition of a database object. A buffer also may be configured generally to store data from a variety of database objects having various metadata definitions.

Data processor module 134 may accumulate identified data within a buffer until the buffer is fall or the amount of data contained within the buffer exceeds a size threshold. Buffer size and associated thresholds may be based on one or more parameters stored within a configuration file.

Once a buffer becomes full or the amount of data reaches a threshold, data loader module 136 determines whether a dedicated data insertion thread is available to insert collected data into destination database 140. Data loader module 136 may use an existing dedicated data insertion thread or create a new dedicated data insertion thread to insert data. Data loader module 136 assigns an available dedicated data insertion thread to insert the collected data into destination database 140, while data reader module 132 and data processor module 134 each continue their respective duties in the background. Further details regarding cross platform data transfer module 130 and the data insertion threads are discussed with respect to FIG. 3 below.

Destination database 140 may be any database system operating on a database platform that is incompatible with the platform of source database 110. Incompatible database platforms may be those developed by different vendors or organizations, for example. An example of incompatibility is where a database export file of one database platform cannot be read or processed by an import utility of a different destination database platform. Import and export utilities of different versions of the same database platform also may be incompatible and could benefit from using cross-platform data transfer module 130.

Illustrated Method for Transferring Data Across Different Database Platforms

Figure 2:
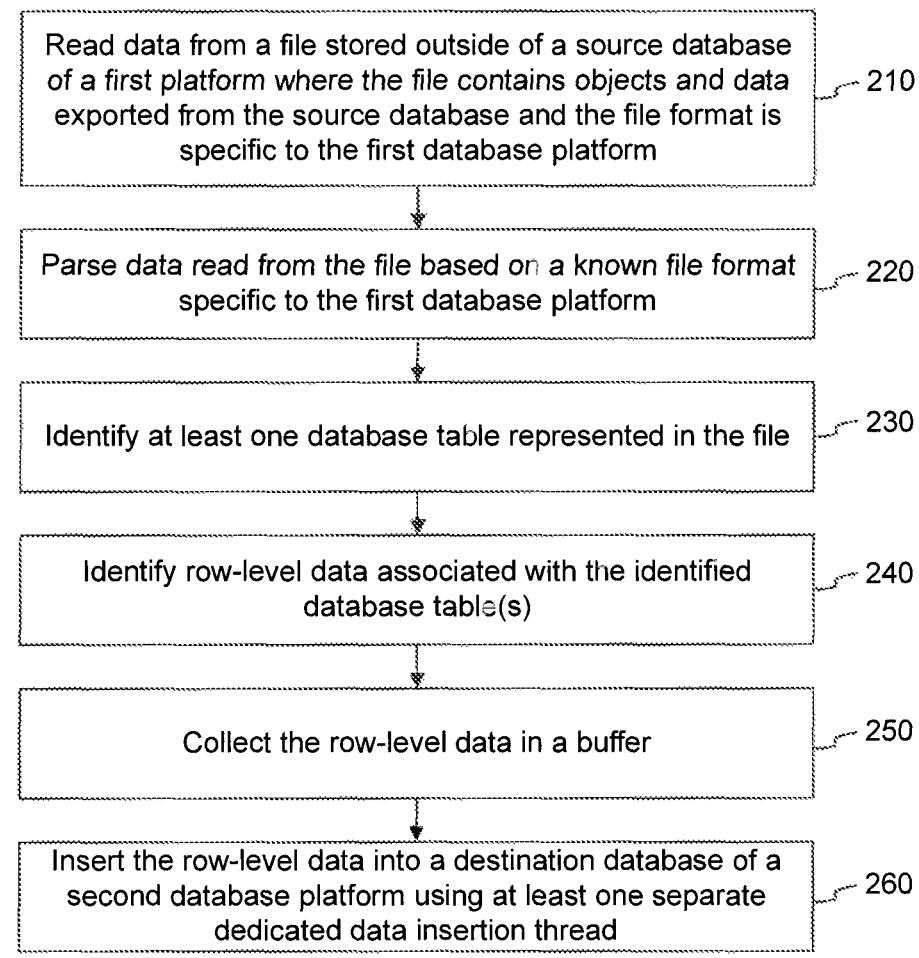
FIG. 2 is a flow diagram of a method for transferring data across different database platforms, according to an embodiment.

FIG. 2 is a flow diagram of a method 200 for transferring data across different database platforms, according to an embodiment. Method 200 begins at stage 210, when data is read from database export file 115. For example, cross-platform data transfer module 130 may open and read data from existing database export file 115. Database export file 115 contains exported objects and data 120 and is produced by running a database export utility against source database 110. Exported objects and data 120 contained within database export file 115 may represent an entire source database 110 or a subset of source database 110. Stage 210 may be performed by, for example, data reader module 132, which may open and read locally or remotely accessible database export files.

At stage 220, data read from database export file 115 is parsed based on a known database export file format associated with a source database platform. Database export file 115 may be a text or binary file. The format of database export file 115 may be determined by one or more of a configuration setting, database export file name, database export file property, data present within the database export file, organization of database export file contents, and other criteria. Stage 220 may be performed by, for example, data reader module 132.

At stage 230, at least one object associated with database data, such as a database table, is identified by parsing the database export file data read at stage 220. An object associated with database data may be identified based on the presence of keywords or special characters within database export file 115. Such objects also may be identified based on the organization of database export file contents. Metadata corresponding to an object also may be identified during stage 230, which may be performed by, for example, data processor module 134.

At stage 240, row-level data associated with a database object, such as a database table, may be identified by parsing the contents of database export file 115. Other embodiments may include the identification of object-level data and other structured and unstructured data associated with a database object. Additional embodiments may include a determination whether identified source data is compatible with a destination platform and conversion of identified source data to a format that is compatible with a destination platform format. Stage 240 may be performed by, for example, data processor module 134.

At stage 250, row-level data identified during stage 240 is collected in a buffer. Such data may be row-level data associated with a database table identified at stage 230. A buffer may be any data type or data structure that can hold data, such as an array, list, or a table. In an embodiment, an array is used as a buffer during stage 250. Identified data is continually appended to the array until it reaches a size threshold, which may be based on a configuration parameter. Stage 250 may be performed by, for example, data processor module 134.

At stage 260, an available dedicated data insertion thread is used to insert collected data into a destination database, such as destination database 140. One or more dedicated data insertion threads may exist and/or new data insertion threads may be instantiated. Once an available dedicated data insertion thread has been identified, the thread is used to insert collected data into the destination database. One or more dedicated data insertion threads may insert data into the destination database while database export file reading and processing continue in the background.

In one example, one or more source objects that do not exist in destination database 140 are created based on a metadata definition available in the database export file or properties of data associated with an exported source object. Additionally, data may be loaded into a generic structure within destination database 140, such as a staging table, designed to hold data from a variety of different database objects.

Another embodiment includes truncation of existing objects in destination database 140 prior to loading exported source data. An additional embodiment includes mapping one or more source database objects or source database object fields to one or more destination database objects or destination database object fields. Such mapping may be configurable and stored within a configuration file. Stage 260 may be performed by, for example, data loader module 136.

Figure 3:
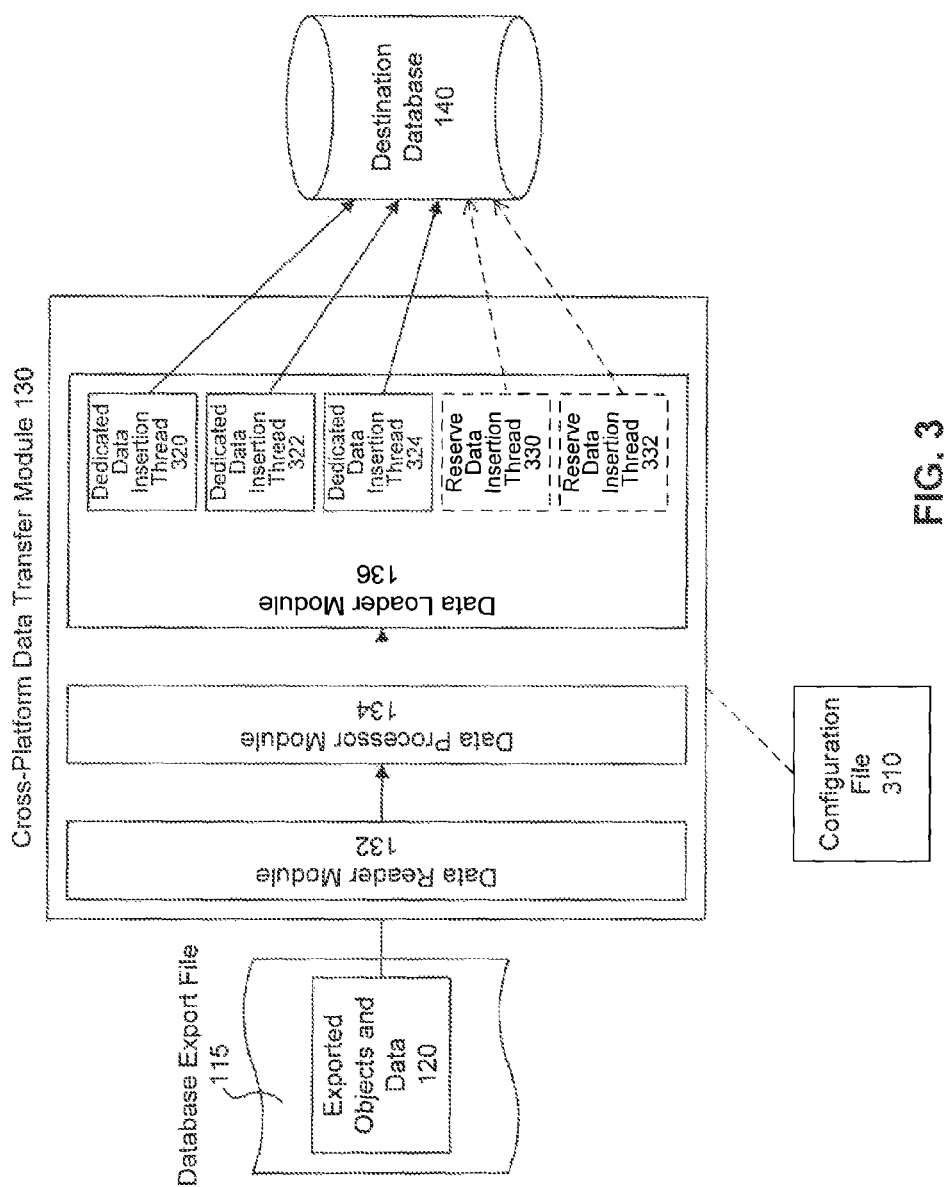
FIG. 3 is another diagram illustrating a system for transferring data across different database platforms according to an embodiment.

Illustrated System for Transferring Data Across Different Database Platforms Using Dedicated Data Insertion Threads FIG. 3 is a diagram illustrating further detail of a system for transferring data across different database platforms according to an embodiment. System 300 includes cross-platform data transfer module 130 having data reader module 132, data processor module 134, and data loader module 136. System 300 also includes database export file 115, exported objects and data 120, a configuration file 310, dedicated data insertion threads 320, 322, and 324, reserve data insertion threads 330 and 332, and destination database 140.

Cross-platform data transfer module 130 may have one or more configuration parameters. The one or more configuration parameters may be defined within the module itself or may be specified within configuration file 310. Configuration file 310 generally represents any structure capable of storing configuration parameters and may include a text-based file located on a file system or configuration parameters stored within a database table.

Database export file 115 contains exported objects and data 120, which represent information exported from a data source, such as a relational database. In an exemplary embodiment, source database 110 is a PostgreSQL source database, and destination database 140 is on the MySQL platform. Destination database 140 cannot process exported objects and data 120 generated from source database 110, because the export and import utilities of the different platforms are not compatible.

According to an embodiment, data reader module 132 reads locally or remotely accessible database export file 115 containing exported objects and data 120. The format of database export file 115 is proprietary and specific to a first platform, which cannot be processed or utilized by destination database 140.

Data reader module 132 may receive an indication of a source platform used to create database export file 115, which may be a configuration parameter in configuration file 310. Data reader module 132 also may be designed to dynamically detect a source platform, based on one or more of a file name, file contents, and file structure.

Data processor module 134 parses database export file 115, based on parsing rules associated with a specified or detected source platform, to locate exported objects and data 120 contained within database export file 115. Data processor module 134 may be configured to process data exported from one or more platforms. Parsing of an export file may be based on one or more of a keyword, a line, a special character, or any other method of parsing.

In an example, data processor module 134 may parse an export file to find one or more keywords used in conjunction with either specified or unspecified table names. When data processor module 134 finds table information to process, it may then identify metadata and data associated with the table based on a known export file structure associated with the source platform.

In another example, data processor module 134 may analyze formatting of identified data, such as row-level or object-level data, and determine whether the formatting is compatible with destination database 140. Data processor module 134 may convert identified data to a format that is compatible with destination database 140, when it determines the data is incompatible with destination database 140. Such formatting conversions may be necessary due to differences in character sets, platforms, and system configurations. Data processor module 134 also may be configured to identify and convert special characters and representations of special characters for use in destination database 140, including but not limited to return carriages and NULL value representations.

Additionally, data processor module 134 may determine whether one or more database objects in database export file 115, such as tables, exist within destination database 140. Data processor module 134 may create one or more database objects in destination database 140 when it determines an exported source object does not exist within destination database 140.

In an example, data processor module 134 may identify a database table represented database export file 115 that does not exist within destination database 140. It may create an identical table structure in destination database 140 according to a metadata definition present within the export file. Data processor module 134 also may create the nonexistent table in destination database 140 based on characteristics of data associated with an exported table.

Once data processor module 134 identifies and prepares the identified data for use in destination database 140, it stores the processed data in a buffer, such as an array, list, or table. Data is added to the buffer as data processor module 134 continues to process additional data.

Once a buffer becomes full or the size of the buffer reaches a specified threshold, data loader module 136 determines whether one or more dedicated data insertion threads 320, 322, and 324 are available to insert the collected data into destination database 140. Dedicated data insertion threads 320, 322, and 324 may exist solely for the purpose of loading data into destination database 140. The size of a buffer and a size threshold used for activating data insertion both may be configurable parameters specified in configuration file 310.

A pool of dedicated data insertion threads 320, 322, and 324 may be created upon execution of cross-platform data transfer module 130, or any other time prior to the use of data loader module 136. Data loader module 136 may create one or more additional dedicated data insertion threads when all previously instantiated threads are busy and a maximum number of dedicated data insertion threads has not been reached. The maximum number of dedicated data insertion threads may be a configurable parameter, which may be specified in configuration file 310.

Reserve data insertion threads 330 and 332 represent non-existent data insertion threads, below the maximum number of dedicated data insertion threads, which may be instantiated for use by data loader module 136. Data loader module 136 also may wait for an available dedicated data insertion thread 320 when all dedicated data insertion threads 320, 322, and 324 are occupied to avoid overconsumption of computer system resources.

When data loader module 136 locates or creates an available dedicated data insertion thread, the thread will insert collected data into destination database 140. According to an exemplary embodiment, one or more dedicated data insertion threads 320, 322, and 324 insert data into destination database 140 using a native driver specific to destination database 140 to increase performance. Direct insertion into database objects may also be performed, bypassing a database engine and/or database query engine, if supported by the native driver.

In another example, at least one dedicated data insertion thread 320 inserts data into destination database 140 using a bulk data loading utility specific to the platform of destination database 140. According to an additional embodiment, all dedicated data insertion threads 320, 322, and 324 may perform data insertion in parallel while continued reading and processing of a database export file continues in the background.

Example Computer System

Figure 4:
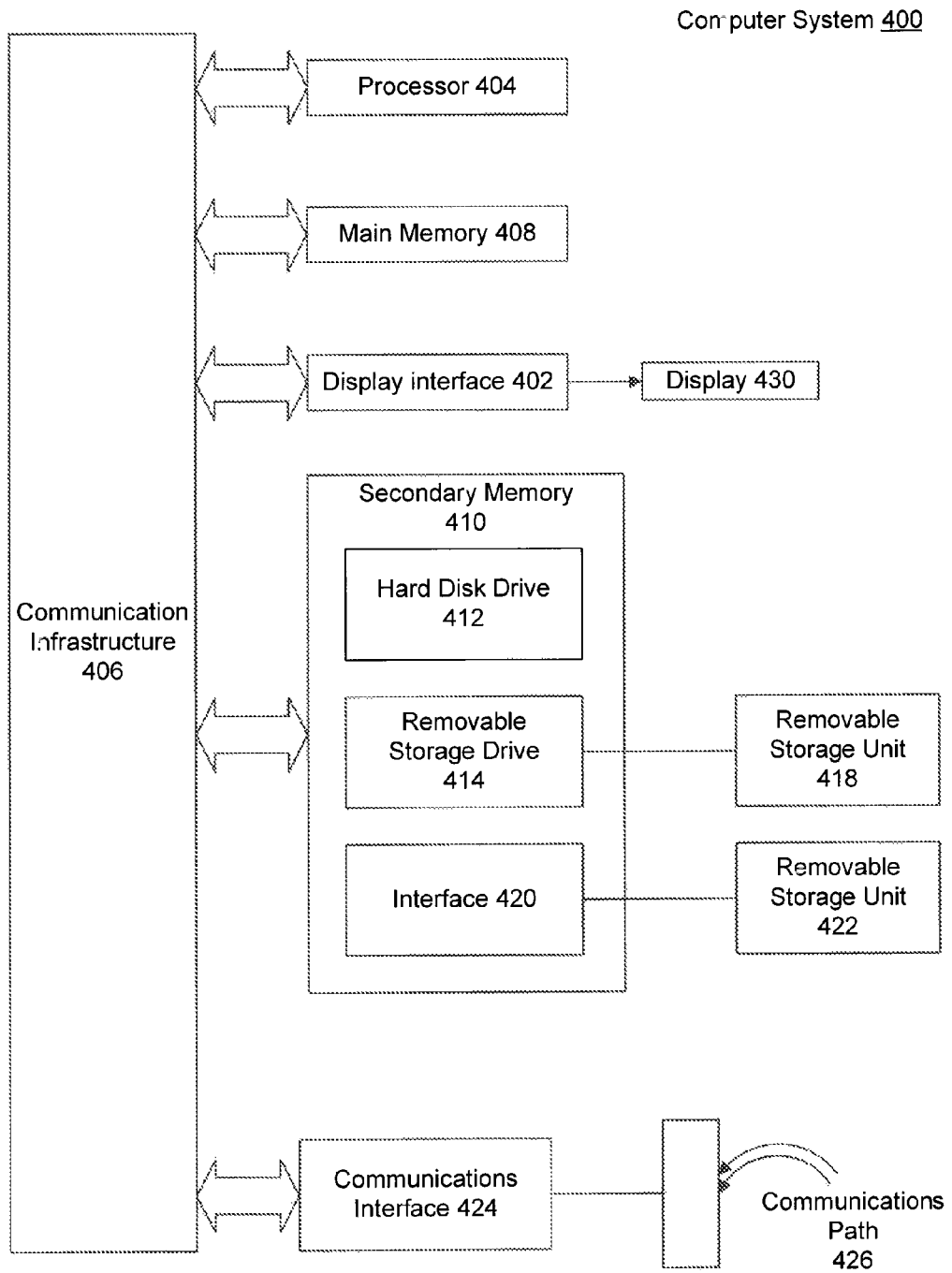
FIG. 4 is a diagram of an exemplary computer system that may be used in an embodiment.

In an embodiment, the system and components of embodiments described herein are implemented using well-known computers, such as example computer system 400 shown in FIG. 4. For example, system 100, system 300, and additional embodiments for transferring data across different database platforms may be implemented using one or more computer systems 400.

Computer system 400 includes one or more processors (also called central processing units, or CPUs), such as a processor 404. Processor 404 is connected to a communication infrastructure 406.

Computer system 400 also includes a main or primary memory 408, such as random access memory (RAM). Main memory 408 has stored control logic (computer software), and data.

Computer system 400 may also include one or more secondary storage devices 410. Secondary storage device 410 includes, for example, a hard disk drive 412 and/or a removable storage device or drive 414, as well as other types of storage devices, such as memory cards and memory sticks. Removable storage drive 414 represents a floppy disk drive, a magnetic tape drive, a compact disk drive, an optical storage device, tape backup, etc.

Removable storage drive 414 may interact with a removable storage unit 418. Removable storage unit 418 includes a computer useable or readable storage device having stored thereon computer software (control logic) and/or data. Removable storage unit 418 represents a floppy disk, magnetic tape, compact disk, DVD, optical storage disk, or any other computer data storage device. Removable storage drive 414 may read from and/or write to removable storage unit 418 in a well-known manner.

Computer system 400 also includes input/output/display devices 430, such as monitors, keyboards, pointing devices, etc., which communicate with communication infrastructure 406 through a display interface 402.

Computer system 400 further includes a communication or network interface 424. Communication interface 424 may enable computer system 400 to communicate with remote devices. For example, communication interface 424 may allow computer system 400 to communicate over communications path 426, such as LANs, WANs, the Internet, etc. Communications interface 424 may interface with remote sites or networks via wired or wireless connections.

Control logic may be transmitted to and from computer system 400 via communication path 426.

Any tangible apparatus or article of manufacture comprising a computer useable or readable medium having control logic (software) stored thereon is referred to herein as a computer program product or program storage device. This includes, but is not limited to, computer system 400, main memory 408, secondary storage device 410, and removable storage unit 418. Such computer program products, having control logic stored thereon that, when executed by one or more data processing devices, causes such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for transferring data across different database platforms, comprising:
   reading data from a database export file generated by an export utility of a first database platform and stored outside of a source database of the first database platform, wherein the database export file contains at least a representation of objects and data from the source database and the database export file has a format specific to the first database platform;
   parsing the data read from the database export file, based on the format;
   identifying at least one database table represented in the database export file, based on the parsing;
   identifying row-level data associated with the at least one database table, based on the parsing;
   collecting the row-level data in a buffer; and
   inserting the collected row-level data in the buffer into a destination database of a second database platform using at least one dedicated data insertion thread responsive to a determination that the collected row-level data in the buffer reaches a configurable size,
   wherein each of the reading, the parsing, the identifying, the collecting, and the inserting steps are performed by one or more computing devices.

2. The method of claim 1, wherein the configurable size comprises a variable configurable size.

3. The method of claim 1, further comprising:
   determining whether the at least one database table exists in the destination database; and
   creating the at least one database table in the destination database, when it is determined that the at least one database table does not exist in the destination database.

4. The method of claim 1, further comprising:
   determining whether formatting of the row-level data is compatible with the destination database; and
   converting the row-level data to a format compatible with the destination database, when it is determined that the row-level data is not compatible with the destination database.

5. The method of claim 1, further comprising:
   identifying special characters within the row-level data; and
   replacing the identified special characters with equivalent representations.

6. The method of claim 1, further comprising:
   determining whether at least one of the at least one dedicated data insertion thread is free to insert the collected row-level data into the destination database; and
   creating at least one additional dedicated data insertion thread when a maximum number of dedicated data insertion threads has not been reached and it is determined that no dedicated data insertion thread is free to insert the collected row-level data into the destination database.

7. The method of claim 6, wherein the maximum number of dedicated data insertion threads is based on a configurable parameter.

8. The method of claim 7, wherein the at least one dedicated data insertion thread inserts data into the destination database using a native driver specific to the destination database.

9. The method of claim 7, wherein the at least one dedicated data insertion thread inserts data into the destination database using a bulk data loading utility specific to the second database platform.

10. The method of claim 8, wherein the first database platform is PostgreSQL and the second database platform is MySQL.

11. The method of claim 1, wherein the identifying at least one database table comprises identifying at least one database table represented in the database export file, based on the parsing to find one or more keywords in conjunction with a name of the at least one database table.

12. A system for transferring data across different database platforms, comprising:
   one or more computing devices;
   a data reader, implemented on the one or more computing devices, configured to read data from a database export file generated by an export utility of a first database platform and stored outside of a source database of the first database platform, wherein the database export file contains at least a representation of objects and data from the source database and the database export file has a format specific to the first database platform;
   a data processor, implemented on the one or more computing devices, configured to:
      parse the data read from the database export file, based on the format,
      identify at least one database table represented in the database export file, based on the parsing,
      identify row-level data associated with the at least one database table, based on the parsing,
      collect the row-level data in a buffer; and
   a data loader, implemented on the one or more computing devices, configured to insert the collected row-level data in the buffer into a destination database of a second database platform using at least one dedicated data insertion thread responsive to a determination that the collected row-level data in the buffer reaches a configurable size.

13. The system of claim 12, wherein the configurable size comprises a variable configurable size.

14. The system of claim 12, wherein the data processor is further configured to:
   determine whether the at least one database table exists in the destination database; and
   create the at least one database table in the destination database, when it is determined that the at least one database table does not exist in the destination database.

15. The system of claim 12, wherein the data processor is further configured to:
   determine whether formatting of the row-level data is compatible with the destination database; and
   convert the row-level data to a format compatible with the destination database, when it is determined that the row-level data is not compatible with the destination database.

16. The system of claim 12, wherein the data processor is further configured to:
   identify special characters within the row-level data; and
   replace the identified special characters with equivalent representations.

17. The system of claim 12, wherein the data processor is further configured to:
   determine whether at least one of the at least one dedicated data insertion thread is free to insert the collected row level data into the destination database; and create at least one additional dedicated data insertion thread when a maximum number of dedicated data insertion threads has not been reached and it is determined that no dedicated data insertion thread is free to insert the collected row-level data into the destination database.

18. The system of claim 17, wherein the maximum number of dedicated data insertion threads is based on a configurable parameter.

19. The system of claim 18, wherein the at least one dedicated data insertion thread inserts data into the destination database using a native driver specific to the destination database.

20. The system of claim 18, wherein the at least one dedicated data insertion thread inserts data into the destination database using a bulk data loading utility specific to the second database platform.

21. The system of claim 19, wherein the first database platform is PostgreSQL and the second database platform is MySQL.

22. The system of claim 12, wherein the data processor is further configured to identify at least one database table represented in the database export file, based on the parsing to find one or more keywords in conjunction with a name of the at least one database table.

23. A non-transitory computer-readable storage medium having control logic recorded thereon that, when executed by a processor, causes the processor to perform operations to transfer data across different database platforms, the operations comprising:
    reading data from a database export file generated by an export utility of a first database platform and stored outside of a source database of the first database platform, wherein the database export file contains at least a representation of objects and data from the source database and the database export file has a format specific to the first database platform;
    parsing the data read from the database export file, based on the format;
    identifying at least one database table represented in the database export file, based on the parsing;
    identifying row-level data associated with the at least one database table, based on the parsing;
    collecting the row-level data in a buffer; and
    inserting the collected row-level data in the buffer into a destination database of a second database platform using at least one dedicated data insertion thread responsive to a determination that the collected row-level data in the buffer reaches a configurable size.

24. The non-transitory computer-readable storage medium of claim 23, wherein the configurable size comprises a variable configurable size.

25. The non-transitory computer-readable storage medium of claim 23, further comprising control logic stored thereon that, when executed by the processor, causes the processor to perform operations comprising:
    determining whether the at least one database table exists in the destination database; and
    creating the at least one database table in the destination database, when it is determined that the at least one database table does not exist in the destination database.

26. The non-transitory computer-readable storage medium of claim 23, further comprising control logic stored thereon that, when executed by the processor, causes the processor to perform operations comprising:
    determining whether formatting of the row-level data is compatible with the destination database; and
    converting the row-level data to a format compatible with the destination database, when it is determined that the row-level data is not compatible with the destination database.

27. The non-transitory computer-readable storage medium of claim 23, further comprising control logic stored thereon that, when executed by the processor, causes the processor to perform operations comprising:
    identifying special characters within the row-level data; and
    replacing the identified special characters with equivalent representations.

28. The non-transitory computer-readable storage medium of claim 23, further comprising control logic stored thereon that, when executed by the processor, causes the processor to perform operations comprising:
    determining whether at least one of the at least one dedicated data insertion thread is free to insert the collected row-level data into the destination database; and
    creating at least one additional dedicated data insertion thread when a maximum number of dedicated data insertion threads has not been reached and it is determined that no dedicated data insertion thread is free to insert the collected row-level data into the destination database.

29. The non-transitory computer-readable storage medium of claim 28, wherein the maximum number of dedicated data insertion threads is based on a configurable parameter.

30. The non-transitory computer-readable storage medium of claim 29, wherein the at least one dedicated data insertion thread inserts data into the destination database using a native driver specific to the destination database.

31. The non-transitory computer-readable storage medium of claim 27, wherein the at least one dedicated data insertion thread inserts data into the destination database using a bulk data loading utility specific to the second database platform.

32. The non-transitory computer-readable storage medium of claim 29, wherein the first database platform is PostgreSQL and the second database platform is MySQL.

33. The non-transitory computer-readable storage medium of claim 23, wherein the identifying at least one database table comprises identifying at least one database table represented in the database export file, based on the parsing to find one or more keywords in conjunction with a name of the at least one database table.

* * * * *